United States Patent [19]

Campbell

[11] 4,092,878
[45] June 6, 1978

[54] FLOATING CARRIER RETENTION FOR A PLANETARY GEARSET

[75] Inventor: John J. Campbell, Decatur, Ill.

[73] Assignee: Caterpillar Tractor Co., Peoria, Ill.

[21] Appl. No.: 743,384

[22] Filed: Nov. 19, 1976

[51] Int. Cl.² ............................ F16H 1/28; F16H 3/44
[52] U.S. Cl. ...................................... 74/801; 74/750 R
[58] Field of Search ............................... 74/801, 750 R

[56] References Cited

U.S. PATENT DOCUMENTS

| | | | |
|---|---|---|---|
| 2,959,073 | 11/1960 | Doerfer et al. | 74/801 |
| 3,115,204 | 12/1963 | Dence | 180/10 |
| 3,150,532 | 9/1964 | Bixby | 74/801 X |
| 3,184,994 | 5/1965 | Stahl | 74/674 |
| 3,292,460 | 12/1966 | Fritsch | 74/801 |
| 3,315,546 | 4/1967 | Fritsch | 74/801 |
| 3,477,547 | 11/1969 | Kress et al. | 184/63 |
| 3,780,601 | 12/1973 | Dach et al. | 74/801 X |
| 3,785,157 | 1/1974 | Kittle et al. | 60/493 |

Primary Examiner—Samuel Scott
Assistant Examiner—Lance W. Chandler
Attorney, Agent, or Firm—Phillips, Moore, Weissenberger, Lempio & Majestic

[57] ABSTRACT

A planetary gear system within a vehicle wheel has a sun gear at the wheel axis driven by a fluid motor and further includes a ring gear secured to the wheel rim. Planet gears, engaging both the sun gear and ring gear, are mounted on a carrier which is revolvable as the planet gears orbit around the sun gear while transmitting drive from the motor to the wheel with a speed reduction and a corresponding torque amplification. The carrier is not tightly restrained in either the radial or axial direction enabling positional self-adjustment to relieve stress concentrations at gear teeth. Limits for the axial and radial play of the floating carrier are fixed by positioner means defining an annular groove into which the radially innermost edge of the carrier is loosely received, thrust bearing means such as thrust pins or annular thrust rings being situated within the groove at each side of the carrier edge. Situating the positioner means at the minimum diameter portion of the carrier minimizes friction, wear, power dissipation and heating as that portion of the carrier turns at a smaller velocity than the more outward portions of the carrier.

12 Claims, 5 Drawing Figures

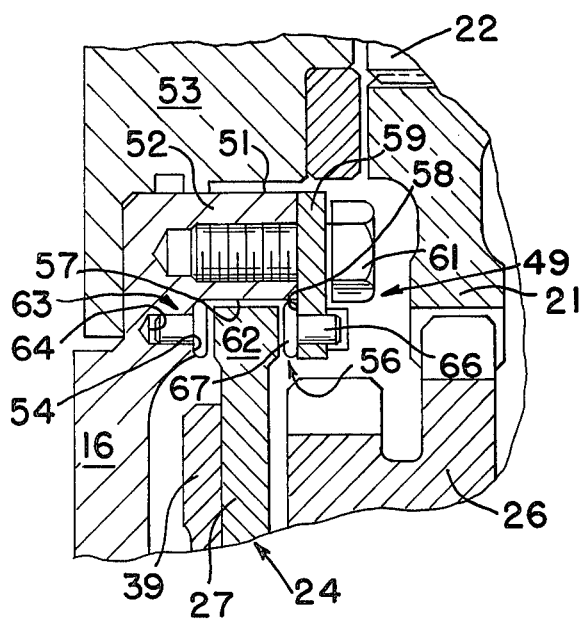
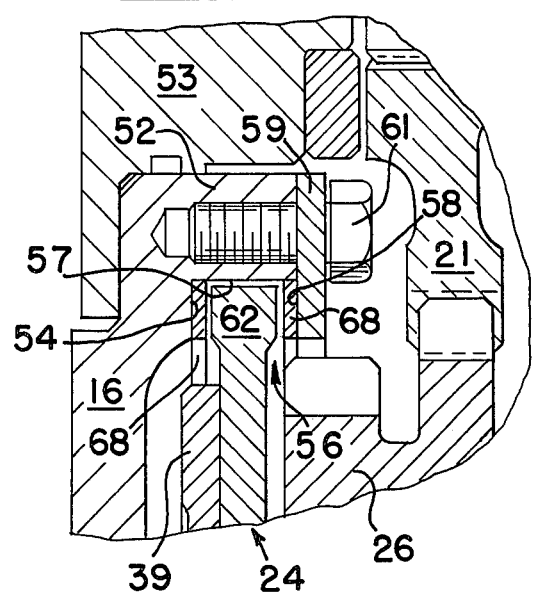
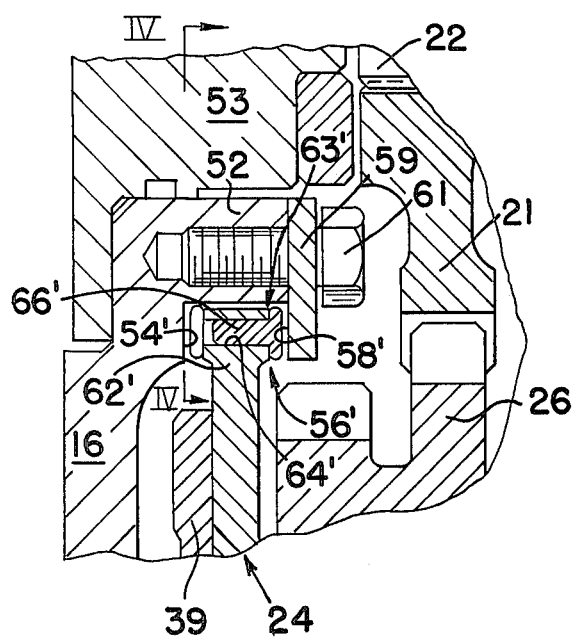
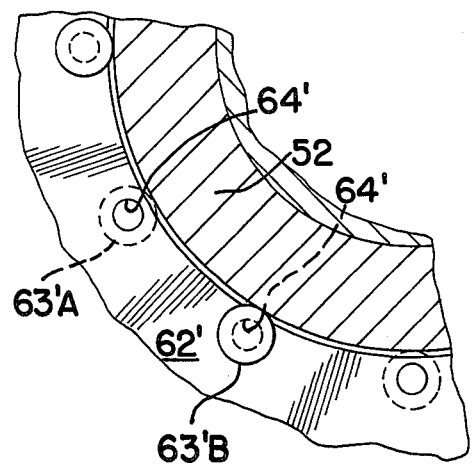

FLOATING CARRIER RETENTION FOR A PLANETARY GEARSET

BACKGROUND OF THE INVENTION

This invention relates to planetary gearing systems and more particularly to structures for positioning and retaining a planet gear carrier therein.

Planetary gearing systems are used in a variety of mechanisms in which rotary drive is to be transmitted while realizing a speed reduction or speed increase accompanied by a torque increase or reduction. The drive arrangements between a fluid motor and a wheel of a vehicle is one example of mechanism in which planetary gearing systems are often used. While planetary gearing systems may take a variety of specific forms, all have in common a planet gear carrier supported for rotation about a primary axis and carrying one or more planet gears which may orbit about the primary axis while also being rotatable about a secondary orbiting axis which is parallel to the primary axis. Depending on the type of planetary gearing system, the planet gears may engage one or both of a sun gear and a ring gear which are both disposed coaxially with respect to the primary axis.

In instances where sizable torque loads must be transmitted through a planetary gearing system, it is a common practice to include more than one planet gear on the carrier. The presence of the additional planet gears does not change the basic functions of the system insofar as speed reductions or speed increases are concerned but do serve to avoid the severe concentration of stress at a limited number of gear teeth, bearings and the like which may occur in a planetary gearing system having a single planet gear.

If the planetary gear carrier is journaled to some other component of the mechanism through conventional bearing means or the like so that it has little if any opportunity to shift radially and axially, then this objective of equally distributing stresses between the several planet gears is imperfectly realized at least at times. This would not be true in theory if the components of the system were manufactured with absolutely exact predetermined dimensions and were located in the planetary gearing system at absolutely exact predetermined positions, but this kind of absolute precision does not usually exist as a practical matter. The gears, bearings, axles and other elements of the system will, as a practical matter, vary somewhat from their theoretical proportions, dimensions and orientations and in any real system the rotational axes, orientations and configurations of such elements will vary slightly from what the designer originally specified.

Because of these factors, at any given moment in a planetary system having a positionally fixed carrier most of the structural stress may be concentrated on a particular one of the plurality of planet gears and on a single particular small segment of the associated sun gear and ring gear while the other planet gears are carrying less than their theoretical share of the load. This concentration of stress may shift from one planet gear to another in the course of a single revolution of the carrier depending on the nature of the departure of the proportions and position of the various parts from the theoretical ideal.

To counteract the adverse unequal distribution of stress loads discussed above, it is a known practice to employ what is termed a floating planet carrier. In such systems the planet gear carrier is not journaled by ordinary bearing means so that it is not rigidly constrained against radial and axial movements. Instead, the planet gears and thus the carrier are essentially supported and positioned by the associated sun gear and ring gear with which the planet gears are engaged. With this arrangement, an incipient unequal distribution of stress loads between the several planet gears tends to be self-correcting. Such a stress concentration inherently acts to shift the planet gears and associated carrier slightly in the radial direction or to tilt the planet gear and carrier assembly relative to the rotational axis to a small degree in such a manner as to tend to maintain an equal distribution of load between the several planet gears.

Where the planet gears and carrier are capable of floating as described above, it is usually necessary to provide means for establishing maximum limits to the positional shifting of the floating components. Where the planet gears engage both a sun gear and a ring gear, movement of the carrier in the radial direction may be inherently limited. However, there may not be any inherent constraint against excessive axial movement of the carrier and planet gears and therefore some kind of retaining or motion-limiting means must be provided. The structures heretofore utilized for such purposes have been effective to establish the desired limits of movement but have been so constituted as to create unnecessary friction with consequent acceleration of wear, unnecessary dissipation of power and unnecessary heating of components of the system.

SUMMARY OF THE INVENTION

This invention provides a planetary gearing system having a floating planet gear carrier capable of a limited amount of radial and axial movement to accommodate to slight irregularities of shape and position of the other components and includes carrier retention means for defining the limits of such movement with the retention means being arranged to minimize friction and consequently to reduce wear, power dissipation and heat generation.

An annular inside edge of the carrier extends loosely into an annular groove defined by the retention means with the carrier edge being of less extent in the axial direction than the groove and being of slightly greater diameter than the innermost part of the groove to provide for a predetermined amount of axial and radial movement of the carrier and planet gears relative to the retention means. In one form of the invention, a series of thrust pins may be mounted in each wall of the groove on each side of the carrier edge to define the limits of axial motion and to provide replaceable wear surfaces. In another form of the invention the thrust pins may extend slightly from opposite sides of the carrier edge itself. In still another form of the invention annular thrust rings may be disposed in the groove at each side of the carrier edge for similar purposes. The location of the retention means at a relatively small-diameter portion of the carrier reduces friction and contributes to the beneficial effects discussed above as the innermost parts of the carrier revolve at a smaller angular velocity than the more outward portions of the carrier.

Accordingly it is an object of this invention to establish predetermined limits for nonrotary movements of the planet gear carrier of a planetary gearing system while minimizing friction, wear, power dissipation and heat generation.

It is a further object of the invention to provide simple economical and readily replaceable thrust bearing means for limiting axial movement of the carrier of a planetary gearing system.

The invention, together with further objects and advantages thereof, will best be understood by reference to the following description of preferred embodiments taken in conjunction with the accompanying drawings.

BRIEF DESCRIPTION OF THE DRAWINGS

In the accompanying drawings:

FIG. 2 is an enlarged view of the portion of FIG. 1 encircled by dashed line II thereon better illlustrating certain aspects of the planet gear carrier retention means, FIG. 3 is a view corresponding essentially to FIG. 2 but illustrating a modification of the planet gear carrier retention means, FIG. 4 is a section view taken along line IV—IV of FIG. 3 further illustrating characteristics of the modification of the retention means, and FIG. 5 is still another view corresponding essentially to FIG. 2 but illustrating still another modification of the planet gear carrier retention means.

DESCRIPTION OF PREFERRED EMBODIMENTS

Figure 1:
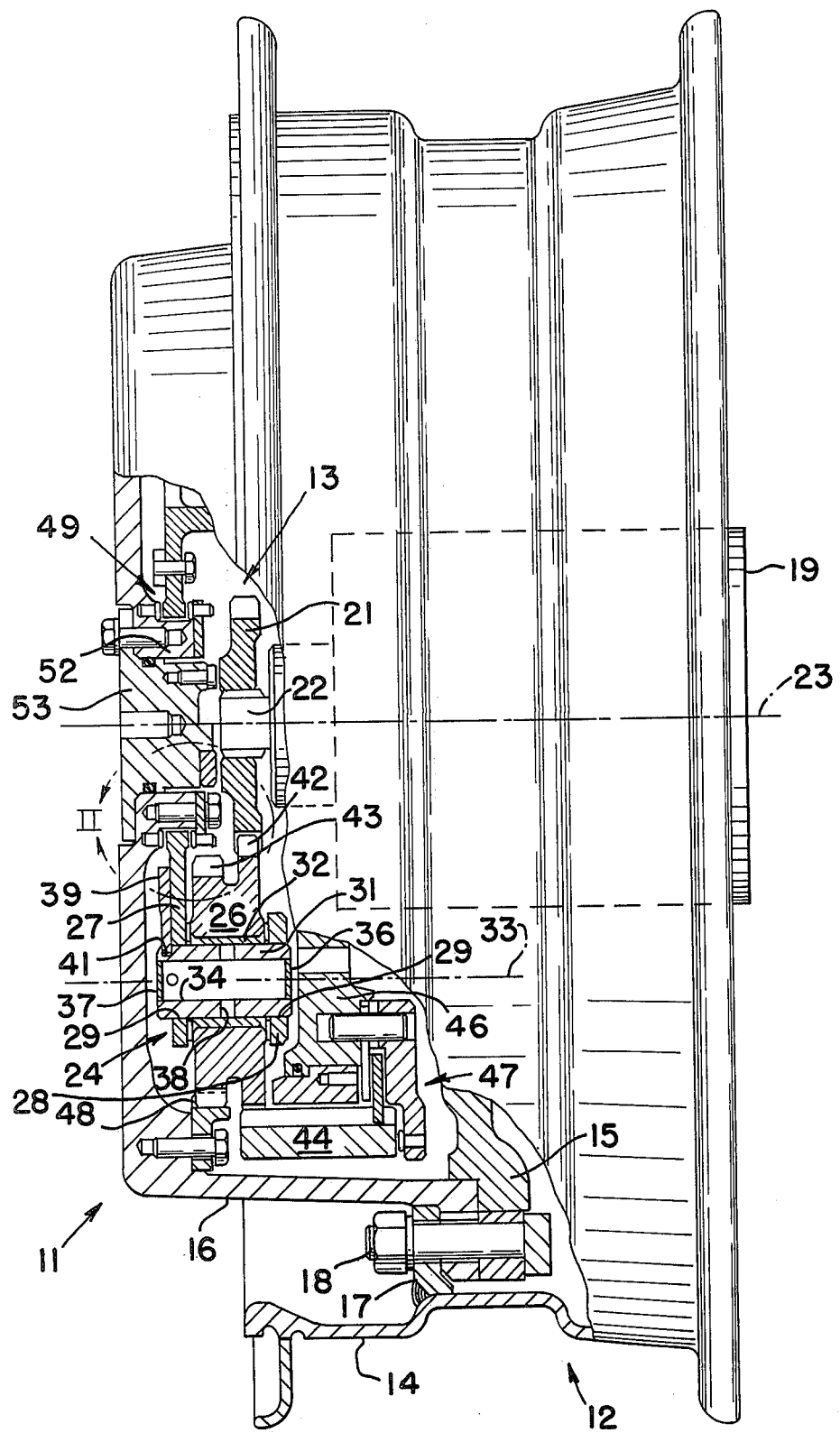
FIG. 1 is a view of a wheel hub and rim for a motor grader vehicle with portions cut away to illustrate the final drive mechanism contained within the wheel including a planetary gearing system.

Referring initially to FIG. 1 of the drawing, the invention was designed for usage in a hydrostatically driven final drive mechanism 11 situated within a wheel 12 of a motor grader vehicle and will therefore be described in that context, it being apparent that the invention may also be adapted to other rotary drive transmitting apparatus of various kinds which also employ a planetary gearing system 13.

In this particular example of the invention, an annular wheel rim 14 is adapted to receive a tire and encircles an annular housing 16 to which it is attached through lugs 17 and bolts 18. Lugs 17 also connect the wheel rim and housing to a rotatable hub 15 which may be journaled on the axle structure of the associated vehicle. Disposed within rim 14 and housing 16 in alignment with the rotary axis 23 of the wheel is a wheel drive hydraulic motor 19 which may also be secured to axle structure of the vehicle of which the wheel is a component in a manner known to the art.

To provide a speed reduction and torque amplification, the planetary gearing system 13 includes a sun gear 21 loosely spline-coupled to the output shaft 22 of the hydraulic motor 19 so that it may be rotated by the motor. The motor output shaft 22 and sun gear 21 are disposed for rotation about the primary rotary axis 23 which is the rotational axis of the wheel rim 12 and housing 16 as well.

The planetary gearing system 13 further includes an annular planet carrier 24 situated within housing 16 and also disposed for rotation about the primary axis 23 in a manner which will hereinafter be described in greater detail. Carrier 24 carries three planet gears 26 in this particular system of which only one of the planet gears is visible in FIG. 1 but which are disposed at equiangular intervals around the carrier, with reference to the primary rotational axis 23, in the manner known to the art. Carrier 24 has a flat annular plate portion 27 and one of three angled bracket arm portions 28 extends from the plate portion around each planet gear 26. To journal the planet gear 26 on the carrier 24, a bore 29 extends through both the carrier plate portion 27 and bracket arm portion 28 to receive an axle pin 31 upon which the planet gear 26 is journaled preferably through a bearing 32. At each planet gear, the axle pin 31 defines a secondary rotational axis 33 about which that planet gear may revolve and which itself orbits around the primary axis 23 when the carrier 24 revolves with respect to the primary axis.

Axle pin 31 may have an axial passage 34 closed at each end by plugs 36. Lubricant is maintained within the housing 16 and a lubricant intake opening 37 is provided in the axle pin 31 at one end while a lubricant outlet or passage 38 at a more central region of the axle pin transmits lubricant to the bearing 32. Intake opening 37 may be arranged to face into the direction of orbital motion of the axle pin to effect a forced flow of lubricant to the bearing 32. Axle pin 31 is retained against axial displacement and also against angular shifting within carrier bore 29 by a retainer element 39 which is releasably secured to the carrier and which has edges entering a slot 41 in the side wall of each axle pin. These provisions for supporting, retaining and lubricating the planet gears 26 on the carrier 24 are described more fully and claimed in my copending application Ser. No. 743,383 entitled PLANET GEAR POSITIONING AND RETAINING MECHANISM, filed concurrently with this application.

The planet gears 26 in this particular system are of the compound form having a first large-diameter set of teeth 42 and a second coaxial but smaller-diameter set of teeth 43. The first teeth 42 engage sun gear 21 and also engage a reaction member or first ring gear 44 which is disposed in coaxial relationship to the primary rotary axis 23 and which encircles all of the planet gears 26. To establish an operational mode in which drive is transmitted from motor 19 to wheel rim 12, the first ring gear 44 is held rotationally fixed by being locked to a rotationally stationary member 46 of the vehicle axle structure by actuation of a fluid pressure-operated clutch 47. Clutch 47 may be selectively disengaged to enable rotation of the first ring gear 44 which has the effect of decoupling the wheel rim 12 from the drive motor 19 to establish a free-wheeling mode of operation.

To transfer drive to the housing 16 and wheel rim 12 when clutch 47 is engaged, a second ring gear 48 is secured within the housing and encircles the planet gears to engage the smaller-diameter set of teeth 43 of each planet gear. When motor 19 turns sun gear 21, the engagement of the planet gears 26 with the rotationally fixed first ring gear 44 constrains the planet gears to rotate about their own axes 33 and also to orbit about the sun gear 21. This orbiting motion of the planet gears causes the carrier 24 to rotate about the primary axis 23 at a rate similar to that of the orbiting speed of the planet gears which speed is substantially less than the angular velocity of the sun gear 21. The second ring gear 48, which engages the smaller-diameter set of teeth 43 of the planet gears, is thereby caused to revolve about the primary axis 23 at a still smaller angular rate. This rotation of the second ring gear 48 turns the housing 16 and rim 14. Thus the wheel 12 is driven through the planetary gearing system 13 by the motor 19 but with a substantial speed reduction and a corresponding torque amplification. The motor 19 is of the reversable form to provide for both forward and reverse travel of the associated vehicle.

The planet gears 26 and associated carrier 24 are of the floating form inasmuch as the carrier is not supported through bearings or other means that create a precisely fixed rotational axis for the carrier. The carrier is able to move in a radial direction, that is within a plane normal to the primary rotational axis 23, and is also able to move in the axial direction, that is in a direction parallel to the primary rotational axis 23. Slight movement of the carrier and planet gear assembly in the radial direction or slight tilting movements which are a combination of radial and axial movement may occur in response to forces acting on the planet gears through the associated sun gear and ring gears as necessary to relieve any unequal distribution of load between the three planet gears as a result of manufacturing irregularities in the configuration of the parts or in the placement and alignment of parts.

While this characteristic of floating or exhibiting play is highly desirable for the reason noted above, the required amount of movement for load-equalizing purposes is small and means must be provided to establish predetermined limits for such movements of the carrier and planet gears. Axial movement in particular must be limited as otherwise interlocking sets of gear teeth of the planet gears, sun gear and ring gears might disengage or partially disengage to the point where torque loads would be concentrated on an undesirably small portion of the teeth creating the possibility of breakage. While radial movement of the carrier and planet gears is inherently limited due to the fact that each planet gear engages the sun gear 21 at one side and the ring gears 44 and 48 at the other side, it may in some cases also be advantageous to provide a more precisely controlled maximum limit of radial movement. Accordingly, carrier retention means 49 establish predetermined limits for nonrotary movement of the carrier 24 and planet gears 26. A first example of such retention means 49 may best be understood by referring to FIG. 2.

Housing 16 has a central opening 51 defined by an annular sleeve portion 52 of the housing which extends inwardly a distance towards the sun gear 21 in coaxial relationship with the sun gear. A removable center member 53 closes and seals the opening 51 of the housing. A flat annular surface 54 at the inner wall of housing 16 adjacent sleeve portion 52 defines one side wall of an annular groove 56 and the adjacent surface 57 of the sleeve portion defines the base of the groove. The other sidewall 58 of the groove 56 is defined by a flat annular member 59 secured in coaxial relationship against the inner end of sleeve portion 52 by bolts 61.

The plate portion 27 of carrier 24 has an annular radially innermost edge 62 which extends into groove 56 for rotation therein. The inner diameter of edge 62 of the carrier is made sufficiently greater than the outer diameter of sleeve portion 52 of the housing to provide a clearance sufficient to enable radial movement of the carrier by the predetermined desired maximum amount. The thickness of edge 62 of the carrier in the axial direction is less than that of the width of the groove 56 and is fixed to enable axial movements of the carrier only up to the predetermined desired limit.

As there is a high probability of wearing at the retention means 49, particularly at the surfaces which define the limits of permissible axial movement of the carrier, it is highly advantageous to provide low-cost replaceable elements such as thrust pins 63 in groove 56 to define the actual axial motion limiting surfaces at each side of carrier edge 62. In the example shown in FIG. 2, a first plurality of the thrust pins 63 are mounted in passages 64 in sidewall 54 of the groove at angular intervals around the groove and another group of such thrust pins are similarly mounted in the opposite sidewall 58. Each such thrust pin 63 may have a shank portion 66 press-fitted into the associated bore 64 and a diametrically enlarged head portion 67 abutted against the one of the groove sidewalls 54 or 58 at which the particular pin is disposed. The end surfaces of the head portions 67 effectively define the limits of permitted axial movement of the carrier 24 and thus the above-described limits of axial movement of the carrier are established by making the carrier edge 62 of appropriately less width in the axial direction than the spacing betweeen the heads 67 of the thrust pins 63 at opposite sides of the carrier.

In addition to enabling replacement of the bearing surfaces within groove 56 when wear occurs, the use of thrust pins 63 or other similar thrust bearing means enables such surfaces to be formed of a material selected specifically with regard to such characteristics as a low coefficient of friction, wear resistance and the like whereas selection of the material of the other structural members which define the groove 56, such as housing sleeve 52, may be more circumscribed in that consideration of such matters as providing high structural strength is also necessary.

A basic benefit of the above-described retention means 49 arises from the fact that the stationary surfaces which the moving carrier 24 may contact are situated at a radially inward region of the carrier structure and preferably at the radially innermost edge as in this example. Such undesirable effects as friction, power dissipation, wearing and heat generation are in part a function of the relative velocity of contacting moving parts. As such areas of moving contact in this construction are located radially inward from the orbital path of the planet gears, the relative velocities between contacting parts are minimized with consequent reduction of the above-described adverse effects.

Modifications of the above-described planet gear carrier retention means 49 are readily possible. Referring now to FIGS. 3 and 4 in conjunction it may be seen that the thrust pins 63' may be mounted in transverse bores 64' in edge 62' of the carrier rather than being mounted in the sidewalls 54' and 58' of the groove 56 as in the previous example. Under this arrangement, the thrust pins 63' are supported on the carrier itself and turn with the carrier. As the shank portions 66' of the pins may extend most of the way through the bores 64' in the carrier edge, the providing of such pins at both sides of the carrier may be arranged for by alternating the pins 63'A which extend from one side of the carrier with the pins 63'B which extend from the other side of the carrier at successive ones of the bores 64' along the carrier edge 62'.

Similarly, thrust bearing means other than the button-like thrust pins described above with reference to FIGS. 2 to 4 may also be employed. Referring now to FIG. 5, a construction may be utilized which is identical to that described with reference to FIG. 2 except insofar as the thrust pins are replaced with a pair of flat annular thrust rings 68 disposed within the groove 56 with each being on an opposite side of the carrier edge 62. Thus one such ring 68 may be disposed against groove sidewall 54 while the other such ring is disposed against the opposite groove sidewall 58. The thickness of the rings 68 in the axial direction is again selected to establish the predetermined desired limits of axial movement of the carrier edge 62.

Thus while the invention has been described with respect to certain specific embodiments, it will be apparent that many modifications are possible and it is not intended to limit the invention except as defined in the following claims.

What is claimed is:

1. In a planetary gearing system, the combination comprising:
    at least one sun gear defining a primary rotational axis,
    at least one ring gear disposed in coaxial relationship with said sun gear and being of greater diameter than said sun gear,
    at least one planet gear disposed between said sun gear and said ring gear and being engaged with each thereof, said planet gear having a secondary rotational axis which moves along an orbital path around said primary rotational axis upon differential rotation between said sun gear and said ring gear,
    positioner means having an annular groove which is coaxial with said sun gear and said ring gear and of smaller diameter than said orbital path, said groove having axially spaced-apart wall surfaces, and
    an annular planet gear carrier carrying said planet gear and being disposed for rotation about said primary axis as said planet gear orbits therearound, said planet gear carrier being of the floating form capable of limited nonrotational movements relative to said sun gear and ring gear, said planet gear carrier having an annular inner edge extending into said groove of said positioner means whereby axial movement of said carrier and said planet gear is restricted.

2. The combination defined in claim 1 wherein the minimum diameter of said annular edge of said carrier at the innermost portion of said edge is greater than the minimum diameter of the interior region of said groove of said positioner means to provide a radial clearance between said carrier edge and the minimum diameter region of said groove of said positioner means enabling said planet gear and said carrier to be supported and positioned in the radial direction through said engagement with said sun gear and said ring gear.

3. In a planetary gearing system, the combination comprising:
    at least one sun gear defining a primary rotational axis,
    at least one ring gear disposed in coaxial relationship with said sun gear and being of greater diameter than said sun gear,
    at least one planet gear disposed between said sun gear and said ring gear and being engaged with each thereof, said planet gear having a secondary rotational axis which moves along an orbital path around said primary rotational axis upon differential rotation between said sun gear and said ring gear,
    positioner means having an annular groove which is coaxial with said sun gear and said ring gear and of smaller diameter than said orbital path, said groove having axially spaced-apart wall surfaces,
    a planet gear carrier carrying said planet gear and being disposed for rotation about said primary axis as said planet gear orbits therearound, said carrier having an annular inner edge extending into said groove of said positioner means whereby axial movement of said carrier and said planet gear is restricted,
    wherein said wall surfaces of said groove of said positioner means are spaced apart a distance greater than the axial thickness of said annular edge of said carrier thereby providing for a predetermined limited amount of axial movement of said carrier relative to said positioner means.

4. The combination defined in claim 3 further comprising thrust bearing means disposed in said groove of said positioner means between said annular edge of said carrier and each of said wall surfaces of said groove.

5. The combination defined in claim 4 wherein said thrust bearing means comprises a first plurality of thrust pins each having an end forming a bearing surface between said carrier edge and one of said walls of said groove of said positioner means, said first plurality of thrust pins being angularly spaced with reference to said primary axis, and
    a second plurality of thrust pins each having an end forming a bearing surface between said edge of said carrier and the other of said wall surfaces of said groove, said second plurality of thrust pins also being angularly spaced with reference to said primary axis.

6. The combination described in claim 5 wherein said first plurality of thrust pins extend from bores formed in said one wall of said groove of said positioner means toward said carrier and said second plurality of thrust pins extend towards the other side of said carrier from additional bores formed in said other wall of said groove of said positioner means.

7. The combination defined in claim 5 wherein said first plurality of thrust pins extend towards said one wall of said groove from bores formed in said edge of said carrier and said second plurality of thrust pins extend towards said other wall of said groove from additional bores formed in said edge of said carrier.

8. The combination defined in claim 7 wherein ones of said first plurality of thrust pins are alternated with ones of said second plurality of thrust pins along said edge of said carrier.

9. The combination defined in claim 5 wherein said ends of said thrust pins are of larger diameter than the remainder thereof.

10. The combination defined in claim 3 wherein said thrust bearing means comprise at least a pair of annular rings each having a diameter similar to that of said groove with one of said rings being disposed in said groove between said carrier edge and said one wall of said groove and the other said rings being disposed in said groove between said carrier edge and said other wall of said groove.

11. The combination defined in claim 1 wherein one of said walls of said groove is formed by a member releasably attached to another member which forms the other of said walls of said groove.

12. The combination defined in claim 5 wherein the minimum diameter of said annular edge of said carrier at the innermost portion of said edge is greater than the minimum diameter of the interior region of said groove to provide radial clearance between said carrier and the minimum diameter region of said groove of said positioner means and wherein the spacing of said ends of said first and second pluralities of thrust pins from each other is greater than the axial thickness of said edge of said carrier to provide axial clearance between said carrier and said positioner means whereby said planet gear and said carrier is supported by said sun gear and said ring gear and may undergo a limited amount of shifting in both the radial and axial direction relative to said groove of said positioner means.

* * * * *